Patented July 26, 1927.

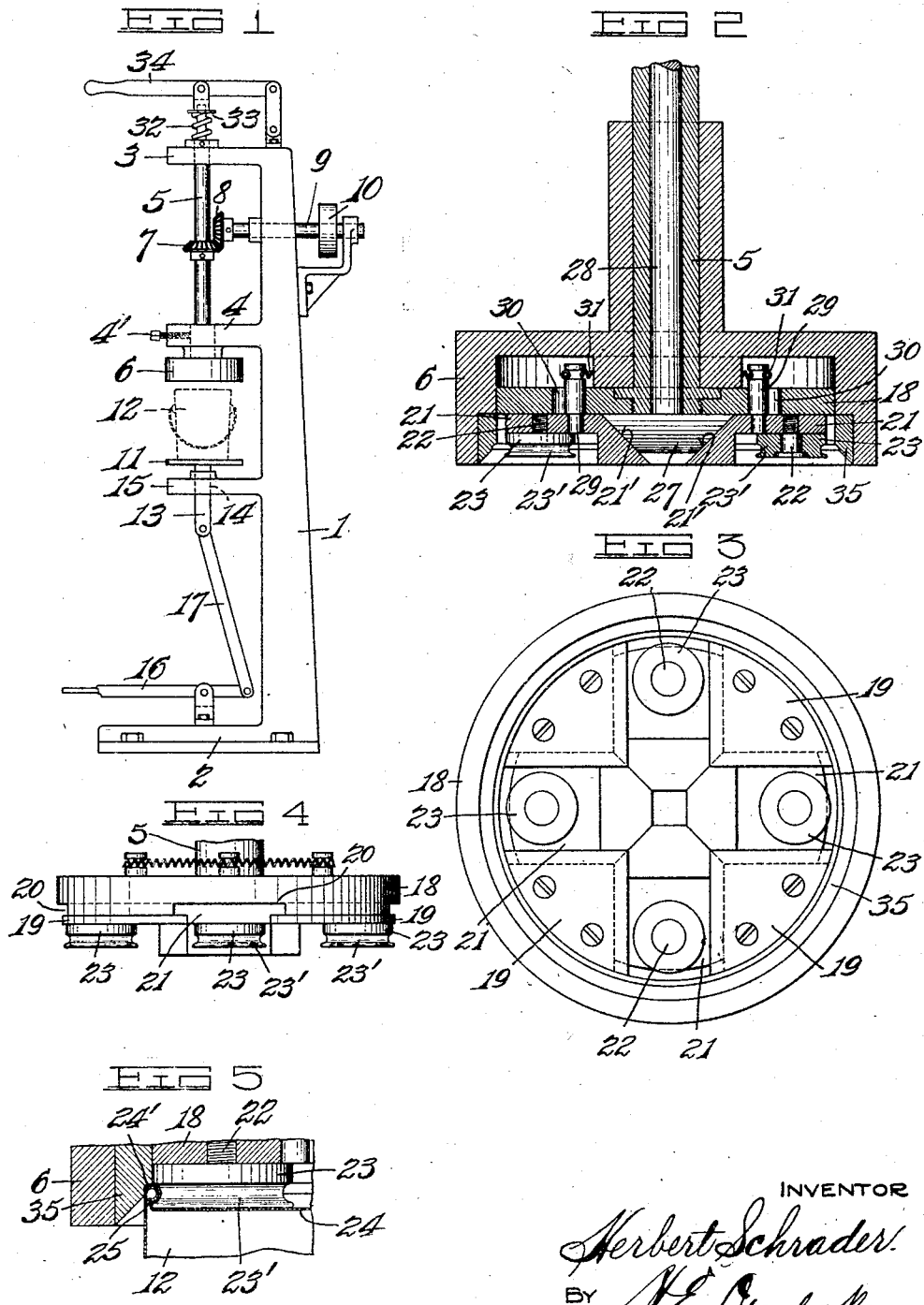

1,636,839

UNITED STATES PATENT OFFICE.

HERBERT SCHRADER, OF WHEELING, WEST VIRGINIA, ASSIGNOR TO WHEELING STEEL CORPORATION, OF WHEELING, WEST VIRGINIA, A CORPORATION OF DELAWARE.

HEADER FOR PAILS.

Application filed August 19, 1926. Serial No. 130,207.

This invention relates broadly to headers for sheet metal containers, and it has for its primary object to provide mechanism for applying covers in sealing relation to cans, pails and the like.

A further object is to provide a simple apparatus by means of which the peripheral walls of dished covers introduced within the open ends of lard pails and similar containers may be expanded conformably to engage and interlock with the inwardly turned terminal beads or rolls formed about said open ends.

In describing said invention in detail, reference is herein had to the accompanying drawings, in which—

Figure 1 is a side elevation of the invention;

Figure 2 is an enlarged vertical section of the expanding head;

Figure 3 is a face view of the same;

Figure 4 is a side elevation of the roller-carrying plate;

Figure 5 is an enlarged detail section of the expanding head illustrating its application to the container cover.

Referring to said drawings, 1 indicates an upright frame or support having a base 2. Carried by said support adjacent to its upper end are arms 3 and 4 in which are journaled the end portions of a vertically disposed hollow shaft 5 which has fixed upon its lower end at a point below the arm 4, as by means of a set screw 4', a downwardly facing cup-like head 6.

Fixed upon said shaft between said arms 3 and 4 is a bevel gear 7 which occupies driven relation to a similar gear 8 carried by a suitable journaled drive shaft 9 which carries a pulley 10 adapted to be driven by a belt from a suitable source of power.

A table 11 forming a support for a can or pail 12 to be acted upon has a vertically depending supporting member 13 which is vertically movable through a guideway 14 provided in a bracket arm 15 carried by the support 2, said table being suitably elevatable, as by means of a pivoted foot-operated lever 16 and a link 17 interposed between said lever and said member 13. Said table is designed, when elevated to present the top of the can or pail 12 which rests thereon within the lower portion of the head 6, as shown in Fig. 5.

Fitted for rotary movement within the head 6 is a plate 18 which is threaded upon the lower end of the shaft 5. Mounted upon the under face of said plate 18 is a plurality of relatively spaced gibs 19 which are so disposed relative to radial channels 20 provided in said head as to form radial dove-tail channels in which are slidably mounted correspondingly shaped shiftable members 21. Each of said members 21 has threaded thereinto the upper end of a pin 22 which constitutes a spindle for a roller 23 having therein an annular groove 23'.

The inner end of each shiftable member 21 is of angular form in vertical section, being extended downward below the level of the rollers 23 for seating upon the pail cover 24 which is to be expanded into embracing interlocked relation to the inwardly turned terminal roll 25 of the pail body 26. Each member 21 has a downwardly and inwardly inclined top surface 21' at its inner end, and slidably seated upon the said surfaces of said members are correspondingly inclined faces provided on the under side of a vertically depressible head or wedge 27 which is fixed upon the lower end of a vertical rod 28 which is movable through the hollow shaft 5. A pin 29 having its lower end mounted in each of the radially shiftable members 21 projects upward through and is movable in a radially disposed slot 30 provided therefor in the plate 18. Said pins 29 are normally positioned at the inner ends of said slots 30 for maintaining the member 21 at their innermost limits of movement, as shown in Fig. 2, being held in said position by suitable yieldable means, as by a retractile coil spring 31 passed around the upper ends of all of said posts and seated in neck portions provided at said ends.

The rod 28 is normally maintained in a position holding the thereby carried head 27 elevated, as by means of a compressing spring 32 interposed between the arm 3 and a fixed collar 33 carried by said rod above said arm, as shown in Fig. 1. Depression of said rod is effected against the tension of said spring 32 by means of a suitably located hand lever 34.

When a can or pail 12 to be headed has been properly seated upon the table 11, a dished cover 24 is slipped over its top with a preformed flange 24' thereof resting upon the top of the inwardly turned roll 25 of the pail. Then, said table is elevated to introduce the top of the pail within the rotating head 6 which has fixed in its lower peripheral portion a beveled seating ring 35 by which the pail is engaged and drawn to its properly centered position in relation to said head. The lever 34 is then depressed for effecting outward radial shifting movement of the members 21, in which movement the rollers 23 are thrust into expanding relation to the portion of the pail cover 24 located below the level of the terminal roll 25 of the pail. The outward pressure thus exerted by said rollers, which latter are being carried by the rotating shaft 5, act gradually to expand the cover to the extent that an annular lip 36 located in underlying interengaged relation to said roll is formed on said cover, as shown in Fig. 5.

What is claimed is—

1. In a header for sheet metal containers, a stationary hollow head adapted to receive within its embrace the ends of a container to be headed, a shaft having an end extended into and rotatable in said head, a plate carried by said end of the shaft and rotatable within said head, gibs carried by the face of said plate and forming radial guideways, a member slidably mounted in each of said guideways, yieldable means normally maintaining said members in inwardly moved positions, cover expanding rollers carried by said members, a rod extending through said shaft, means carried by said rod and movable with the latter for actuating said members to carry said rollers into expanding relation to said cover, and means for actuating said rod, said rod and said shaft being relatively independent in operation.

2. In a header for sheet metal containers, a stationary hollow head adapted to receive within its embrace the end of a container to be headed, a hollow shaft having an end extended into and rotatable in said head, a plate carried by said end of the shaft and rotatable within said head, gibs carried by the plate on its outer face and forming radial guideways, a plurality of members slidably mounted in said guideways, means normally holding said members retracted, rollers carried by said members and shiftable with the latter into expanding relation to a container head, and means movable through said shaft for shifting said members to operative position, the last mentioned means and said shaft being actuated independently of each other.

3. In a header for sheet metal containers, a stationary hollow head adapted to receive within its embrace the end of a container to be headed, a hollow shaft having an end extended into and rotatable in said head, a plate carried by said end of the shaft and rotatable within said head, gibs carried by the plate on its outer face and forming radial guideways, a plurality of members slidably mounted in said guideways, means normally holding said members retracted, rollers carried by said members and shiftable with the latter into expanding relation to a container head, and means for shifting said members to operative position, the last mentioned means including a longitudinally shiftable rod directed through said hollow shaft and being relatively independent of the latter in its operation.

4. In a header for sheet metal containers, a stationary hollow head adapted to receive within its embrace the end of a container to be headed, a hollow shaft having an end extended into and rotatable in said head, a plate carried by said end of the shaft and rotatable within said head, gibs carried by the plate on its outer face and forming radial guideways, a plurality of members slidably mounted in said guideways, means normally holding said members retracted, rollers carried by said members and shiftable with the latter into expanding relation to a container head, means for shifting said members to operative position, the last mentioned means including a longitudinally shiftable non-rotatable rod, and a head carried by said rod in cooperative actuating relation to said members, said rod being directed through said hollow shaft and being operable wholly independent of the latter.

5. In a header for sheet metal containers, a stationary hollow head of shallow downwardly facing form, a rest for a container to be headed, said rest being adapted for elevation to present the end of a container within the embrace of said head, a hollow shaft having an end extended into and rotatable within said head, a plate carried by said end of the shaft and rotatable with the latter, said plate having therein radial slots, gibs carried upon the face of said plate and forming radial guideways, a member slidably mounted in each of said guideways and carrying pins which are movable in said slots, yieldable means engaged with said pins normally maintaining said members in inwardly moved positions, cover expanding rollers carried by said members, and means shiftable through said shaft for actuating outwardly sliding movement of said members for carrying said rollers into expanding relation to said cover, said rod and said shaft being independently operable.

In testimony whereof, I affix my signature.

HERBERT SCHRADER.